United States Patent [19]

Lefkowitz et al.

[11] 4,037,050
[45] July 19, 1977

[54] FAULT ISOLATION IN COMMUNICATIONS CIRCUITS

[75] Inventors: Michael Lefkowitz, Lakewood; Michael Gordon Taylor, Holmdel, both of N.J.

[73] Assignee: Bell Telephone Laboratories, Incorporated, Murray Hill, N.J.

[21] Appl. No.: 690,018

[22] Filed: May 26, 1976

[51] Int. Cl.$^2$ ............................................. H04L 1/00
[52] U.S. Cl. ................................................. 178/69 G
[58] Field of Search ............. 178/69 G, 69 R; 325/41, 325/52; 179/1 P; 340/146.1 R

[56] References Cited

U.S. PATENT DOCUMENTS

| | | | |
|---|---|---|---|
| 3,331,921 | 7/1967 | Neiswinter et al. | 178/69 G |
| 3,331,922 | 7/1967 | Neiswinter et al. | 178/69 G |
| 3,882,456 | 5/1975 | Takada | 178/69 G |
| 3,887,824 | 6/1975 | Blauert et al. | 178/69 G |

Primary Examiner—Thomas A. Robinson
Attorney, Agent, or Firm—Joseph P. Kearns

[57] ABSTRACT

In a multipoint data communications system in which a central processing unit communicates with a plurality of remote terminals over a shared two-way communications facility, an automatic fault isolation circuit is provided to monitor energy levels originating at the several remote terminals. One or more energy level thresholds are incorporated into bridging locations through which incoming and outgoing address and message signals are distributed to, and collected from, remote terminals by way of the shared facility for the purposes of detecting noise buildups and isolating trouble conditions automatically without human intervention.

6 Claims, 3 Drawing Figures

FAULT ISOLATION IN COMMUNICATIONS CIRCUITS

FIELD OF THE INVENTION

This invention relates to fault isolation in multipoint bridges between a shared data communications transmission facility and pluralities of remote terminals served by a single central data processing terminal.

BACKGROUND OF THE INVENTION

Private line multipoint data communications circuits are used in real-time systems in which a central processing terminal (a computer, for example) communicates with a plurality of remote terminals over a shared two-way communitcations facility. Typical multipoint systems include news wire services, airline reservation services and on-line banking services.

Multipoint circuits often involve a polling protocol where the central processing unit (CPU) transmits data over the shared facility addressed to an single remote terminal with only the remote terminal addressed returning data to the CPU. At any particular time, the equivalent of a point-to-point circuit connection exists between the CPU and a single remote terminal.

A multipoint data bridge interconnects the backbone transmission facility and one or more of the remote terminals on a branch of the transmission facility. It is generally located in a telephone central office or at a special private line service center. Each branching location of the backbone facility includes a bridge assembly which further comprises two electrically independent bridges. These bridges are identified as the distribution bridge and the collection bridge. The distribution bridge connects and outgoing or downstream transmission path to the receiver side of remote terminals. The collection bridge connects the transmitter side of remote terminals to the incoming or upstream transmission path. At the collection bridge, to which this invention relates, one or more remote terminal branches are connected through equalizing, balancing and impedance matching pads to the upstream transmission path. Under ideal conditions only response signals of short duration from the addressed remote terminals should appear at any collection bridge. However, under practical conditions two significant troubles can manifest themselves. There exist the noise-buildup and streaming troubles that are difficult to assign to a particular remote terminal branch without individual diagnoses of the respective remote terminal branches.

Noise buildup results from the summation at a collection bridge of all the noise energy arising in the branches connected directly to that collection bridge or indirectly through other intermediate collection bridges. Individual noise sources are difficult to trace, but the origin of such noise is usually ascribed to poor cable connections.

Streaming is a trouble condition in which a remote modem (data set) is transmitting an unmodulated carrier signal continuously because of a control failure at the terminal, or a failure in the modem connected to it.

Various proposals have been made to overcome the noise-buildup and steaming troubles. One approach would only connect to the collection bridge that branch which has a predetermined energy level present and lock out all other branches. Another proposal is that of addressable switching whereby only a remote terminal addressed through the distribution bridge by the CPU would be connected to the collection bridge. This approach is code sensitive and therefore in conflict with the goal of keeping the bridges as transparent as possible at all times to signal energy.

It is accordingly an object of this invention to improve the performance of and simplify maintenance problems for private line multipoint voiceband data services.

It is another object to provide for automatic fault isolation on analog multipoint data circuits.

It is a further object to reduce downtime for trouble diagnosis on analog multipoint data circuits.

SUMMARY OF THE INVENTION

In accordance with this invention the energy from each remote terminal in a multipoint data transmission system incident at the collection half of an analog split bridge is continuously monitored, compared with one or more predetermined threshold levels, and timed to separate valid signals from invalid ones. Failure to meet monitoring criteria results in the automatic opening of the connection of the remote terminal to the bridge and the termination of the dropped connection in its characteristic impedance. One or more threshold levels is chosen to lie between the highest tolerable noise level and the lowest valid signal level. Whether one or more than one threshold is selected is determined in part by economic considerations. The duration of an associated timer for persistence of noise or continuous carrier signal energy is based on the expected polling-cycle length, which is likely to be counted in minutes and fractions thereof. In addition to opening the connection to a failed remote terminal, an alarm can also be registered by failure of the threshold comparison. Moreover, clearing of the trouble restores the connection automatically.

A feature of this invention is that only those remote terminals experiencing trouble are disconnected at the analog bridge without affecting the use of the backbone transmission facility by terminals at other remote locations. The backbone facility remains essentially transparent except for a catastrophic failure affecting a plurality of remote terminals.

Another feature of this invention is that troubles are automatically sectionalized between a remote terminal and a leg of the backbone facility.

BRIEF DESCRIPTION OF THE DRAWING

The objects and features of this invention will become more apparent from a consideration of the following detailed description and the drawing in which.

DESCRIPTION OF THE ILLUSTRATIVE EMBODIMENTS

Figure 1:
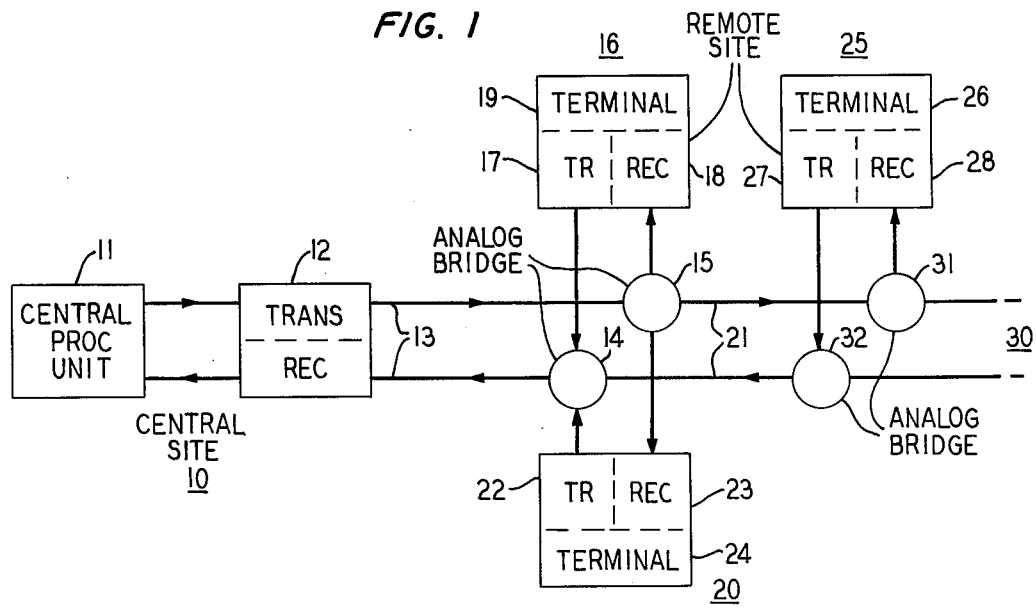
FIG. 1 is a block diagram of a multipoint data communications system including a central processing unit, a backbone two-way transmission medium, a plurlity of analog bridges and a plurality of remote terminals.

A typical private line multipoint transmission system is depicted in FIG. 1. Such a system comprises, as shown, a central site 10, including a central processing unit 11 and a bidirectional modem 12; a backbone transmission facility with sections 13 and 21; analog bridges 14, 15, 31 and 32; remote sites 16, 20 and 25; and extension 30 to the backbone transmission facility. Central site 10 provides computer storage and control facilities for the overall system. It is capable of addressing remote terminals, monitoring their transmissions and automatically responding to requests for information stored thereat. Modem 12 processes incoming and outgoing messages so as to render them compatible with the operating characteristics of the central processing unit (CPU) 11 and the transmission facility 13. Transmission facility 13 has independent incoming and outgoing legs as indicated by the directional arrows.

Each remote site designated 16, 20 and 25 includes a bidirectional modem 17-18, 22-23, and 27-28 and a terminal 19, 24 or 26. A remote terminal upon recognizing its address, and having a message waiting, transmits that message to the CPU. These messages are characteristically random, short and bursty so that the backbone transmission facility can be shared with little interference by a large number of remote terminals. A representative system can include many more remote terminals than the three diagrammed in FIG. 1.

Along the backbone transmission facility 13-21-30 are connected a plurality of analog bridges such as 14, 15, 31 and 32. A complete split bridge comprises an outgoing or distribution half, such as elements 15 and 31, and a return or collection half, such as elements 14 and 32 in FIG. 1. A distribution half of a bridge provides proper impedance, gain and equalization for the signals sent from the CPU to the remote terminals connected to the bridge and to continuing legs of the backbone transmission facility. A collection half of a bridge linearly combines signals transmitted either directly from remote terminals to the CPU or though other bridges along the backbone facility. Transmission through collection halves is in a switched carrier mode. In the split bridge there is complete isolation between the two directions of transmission. Under ideal conditions a collection half of a split bridge should see only one signal at a time: namely, the one from the remote terminal addressed by the CPU.

Associated with the CPU and also with each remote site is a data modem providing a transmitter and receiver for matching outgoing signals to the transmission medium and incoming signals to the CPU at central site 10 or to the terminal at each remote site. As an example, remote site 16 includes modem transmitter 17, modem receiver 18 and terminal 19. Modems are well known as apparatus for converting between the digital baseband frequency spectrum of signals originating at the CPU and at terminals and the analog passband frequency spectrum of transmission media.

Figure 2:
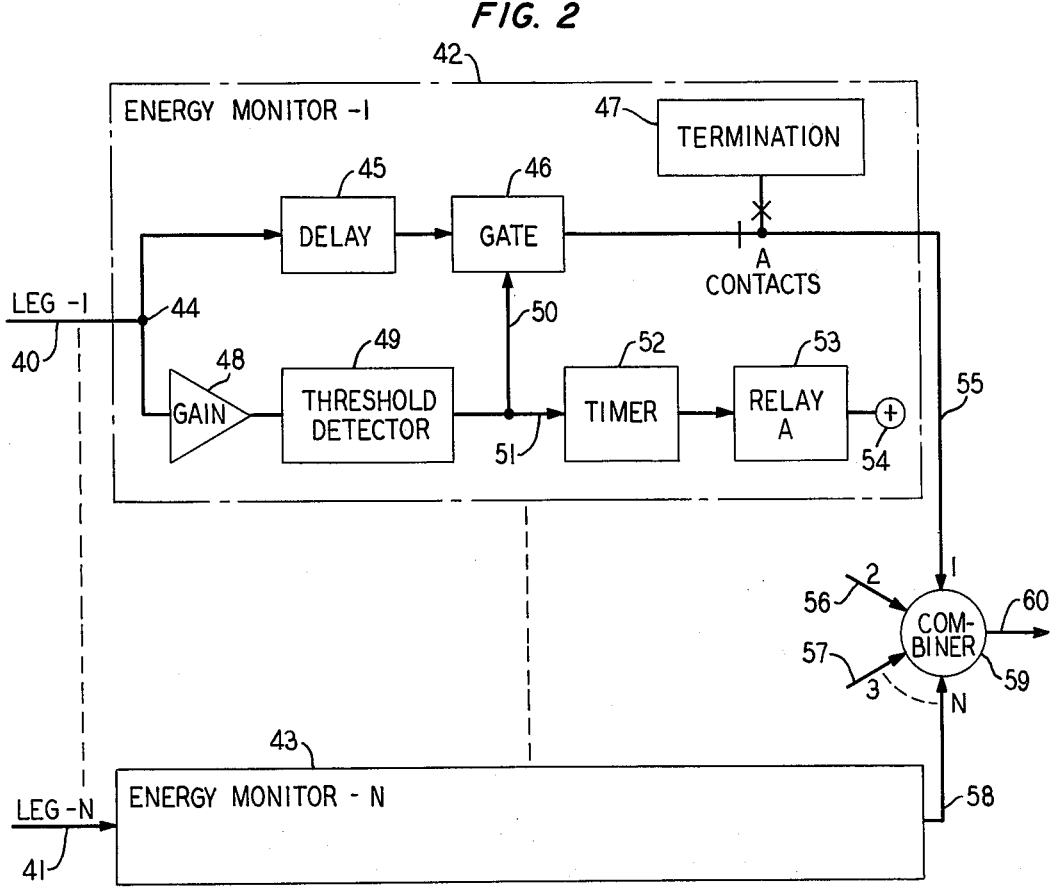
FIG. 2 is a block diagram of a multipoint collection bridge modified according to this invention to provide one threshold monitor for automatic fault isolation.

FIG. 2 is a block diagram of the collection half of a split multipoint bridge modified according to the invention to monitor outgoing signal energy and to isolate transmission legs to remote sites with faults. In the collection bridge a plurality of transmission legs, such as those designated 40 and 41, are brought to a combiner 59 having a plurality of inputs 1 through N. Illustratively in FIG. 2 energy monitor 42 is connected to inpur port 1 of combiner 59 over lead 55 and energy monitor 43 is connected to input port N over lead 58. Other leads 56 nd 57 are shown as providing connections to additional energy monitors (not shown) at input ports 2 and 3.

Energy monitor 42 comprises as shown a branching input juction 44, delay unit 45, transmission gate 46, termination 47, gain device 48, threshold detector 49, timer 52 and relay 53. Relay power is derived from a direct-current source (not shown) having a terminal 54.

Energy monitor 43 is identical to energy monitor 42.

In standby condition energy monitor 42 blocks transmission of any signals to output lead 55 by reason of the normal open state of gate 46. Relay 53 is in the released condition so that the break portion of its transfer contacts A connect output lead 55 to the output of gate 46. When a valid signal occurs it is applied through gain device 48 to threshold detector 49, a square-law device followed by an integrator whose threshold level is set below the expected level of a valid signal but above average noise. About one millisecond or so is required to activate the threshold detector which cuts through gate 46 over lead 50 and activates timer 52 over lead 51. In the meantime the desired signal has been delayed in delay 45 beyond the period for activation of threshold detector 49 with the result that no customer signal has been lost. Valid message signals normally last no longer than a minute or two. Noise energy exceeding the threshold level and persisting longer than the duration of the seating of timer 52 causes the operation of relay A from source 54 and closes the make-portion of the A contacts to termination 47, typically having a fixed impedance of 600 ohms. An alarm circuit can readily be activated by another contact (not shown) on relay A. In the above manner a remote terminal in trouble is isolated from the remainder of the multipoint bridge circuit.

Should the input energy fall below the threshold, gate 46 in opened (to block signal transmission). Timer 52 can be provided with a holdover period of the order of 100 milliseconds to account for momentary drop-outs; thus, when the incoming signal stays below the threshold for longer than the holdover period, relay A is released, any associated alarm indication is turned off (an alarm lock-up could be an option), and the bridge is restored to normal operations. Self-clearing troubles retore the bridge circuit.

Figure 3:
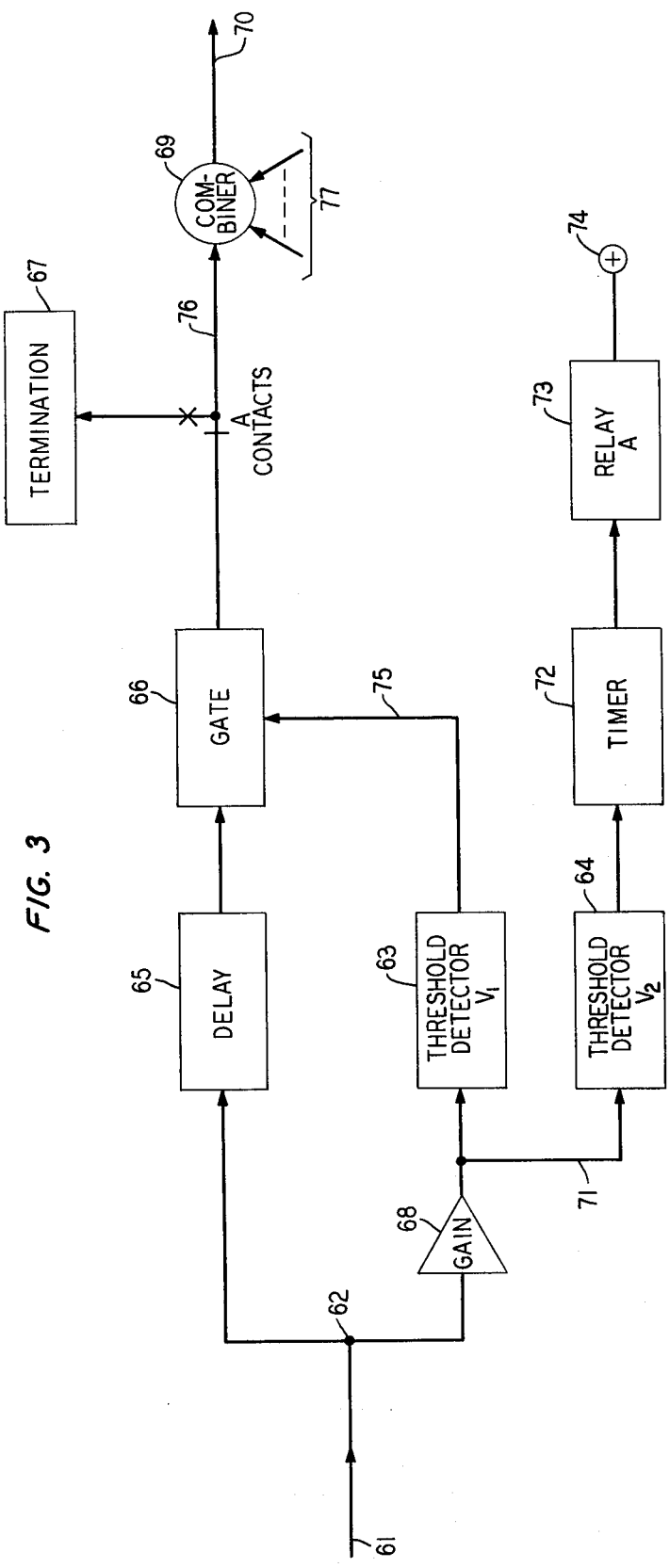
FIG. 3 is a detailed block diagram of a multipoint collection bridge modified according to this invention to provide two threshold monitors for automatic fault isolation.

FIG. 3 depicts an alternative embodiment of a multipoint bridge providing for automatic trouble isolation and noise buildup prevention. The bridge shown in FIG. 3 comprises an input leg 61 from a remote terminal to junction point 62; a monitoring branch further comprising gain circuit 68, threshold detector 63 (having a threshold level $V_1$) threshold detector 64 (having a threshold level $V_2$) timer 72 and A relay 73; and a signal transmission branch further comprising delay 65, gate 66, termination 67, combiner 69 and transmission circuit 70. Other energy monitor circuits (not shown) feed into the combiner through leads 77. Relay A in the monitoring branch controls transfer contacts A in the transmission branch. Positive terminal 74 provides direct current power to relay A.

A threshold level is established in advance for each of detectors 63 and 64 on the bases of expected signal level and average noise level, respectively. A threshold level $V_2$ is chosen for threshold detector 64 which lies just above the highest value of noise to be expected in the circuit. A threshold level $V_1$ is chosen for threshold detector 63 which lies just below the lowest expected value for the signal energy at the input to the collection bridge. Timer 72 is assigned a time duration T in seconds which is related to the anticipated polling cycle. In a practical situation the duration T is on the order of five minutes or less.

When a valid signal occurs, i.e., with energy exceeding $V_1$, the output of detector 63 closes gate 66, which establishes a signal path to the combiner.

When noise or signal energy persists above threshold $V_2$ in detector 64 for longer than duration T, the output of timer 72 causes relay A to open the signal path and terminate the bridge port 76.

Multipoint bridges can also be connected in tandem. Continuous energy on the backbone transmission medium can also be monitored by the arrangements described. However, it may be undesirable to monitor noise on a backbone tandem path to avoid cumulative delay with tandem bridges.

The delay feature provided by delay unit 45 in FIG. 2 and delay unit 65 in FIG. 3 to avoid message signal loss during initial noise monitoring periods is disclosed in more detail in the copending patent application of F. R. Magee, Jr., and S. B Weinstein, Ser. No. 768,677, filed Feb. 15, 1977.

While this invention has been disclosed by way of specific illustrative embodiments, it will be apparent to one skilled in the art that its principle is susceptible of modification within the spirit and scope of the following claims.

What is claimed is:

1. In a bridge circuit connecting a plurality of remote communications terminals to a common communications facility extending to a central processing terminal, means for monitoring the energy levels of signals originating at each remote terminal comprising means for detecting an energy level in excess of one or more threshold energy levels, gating means responsive to the detection by said detecting means of an energy level exceeding one of said threshold levels for cutting through said remote terminal to said comunications facility, timing means responsive to the detection by said detecting means of an energy level exceeding one of said threshold levels for measuring the persistence of continuous energy from a remote terminal beyond a preselected time duration to generate a time-out signal, and means responsive to the time-out signal from said timing means for blocking the further transmission of signal energy to said communications facility.

2. The bridge circuit defined in claim 1 in which said timing means responsive to a signal energy input exceeding said predetermined threshold level for a preassigned duration changes its otuput from one binary state to another to generate said time-out signal and relay means responsive to said time-out signal opens and closes a transmission path between a remote terminal and a communications facility.

3. The bridge circuit defined in claim 1 in which said gating means responds to the detection of a first threshold energy level commensurate with the expected minimum level of a valid message signal and said timing means responds to the detection of a second threshold energy level commensurate with the expected maximum level of background noise energy.

4. In a bridge circuit connecting a plurality of remote communications terminals to a common communications facility extending to a central processing terminal, means within said bridge circuit for monitoring the energy levels of signals originating at each remote terminal comprising first threshold means responsive to the persistence of continuous energy above a first predetermined threshold level from a remote terminal, timing means responsive to said first threshold means for measuring preselected time duration of continuous energy above said first threshold level, means responsive to said timing means for blocking transmission of signal energy to said communications facility, second threshold means responsive to signal energy above a second predetermined threshold level from a remote terminal for any duration less than said preselected time duration, and gating means responsive to said second threshold means for cutting through said remote terminal to said communications facility.

5. The brige circuit defined in claim 4 in which said first threshold level is below said second threshold level.

6. The bridge circuit defined in claim 4 in which said first threshold level is just above the average expected noise level and said second threshold level is just below the level of a valid signal.

* * * * *